(12) United States Patent
Hiroike et al.

(10) Patent No.: US 8,127,913 B2
(45) Date of Patent: Mar. 6, 2012

(54) TRANSPORTATION STATE EVALUATION METHOD FOR A RECORDING MEDIA PROCESSING DEVICE

(75) Inventors: Go Hiroike, Matsumoto (JP); Takashi Saikawa, Shiojiri (JP); Atsushi Natsuno, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 472 days.

(21) Appl. No.: 12/228,550

(22) Filed: Aug. 13, 2008

(65) Prior Publication Data

US 2009/0051109 A1    Feb. 26, 2009

(30) Foreign Application Priority Data

Aug. 23, 2007   (JP) ................................. 2007-216795

(51) Int. Cl.
*G07F 7/04* (2006.01)
(52) U.S. Cl. ..................................................... 194/210
(58) Field of Classification Search .................. 194/210, 194/217, 200, 206
See application file for complete search history.

(56) References Cited

U.S. PATENT DOCUMENTS

| | | | | |
|---|---|---|---|---|
| 4,299,325 A | * | 11/1981 | Quinton et al. | 209/553 |
| 5,295,196 A | * | 3/1994 | Raterman et al. | 382/135 |
| 2004/0182675 A1 | * | 9/2004 | Long et al. | 194/206 |
| 2005/0150738 A1 | * | 7/2005 | Hallowell et al. | 194/206 |
| 2006/0157390 A1 | * | 7/2006 | Otsuka | 209/534 |
| 2008/0099560 A1 | | 5/2008 | Fujikawa et al. | |

FOREIGN PATENT DOCUMENTS

| | | |
|---|---|---|
| JP | 06-278329 | 10/1994 |
| JP | 2004-206362 | 7/2004 |
| JP | 2005-225581 | 8/2005 |
| JP | 2005-225661 | 8/2005 |
| JP | 2008-117040 | 5/2006 |

* cited by examiner

*Primary Examiner* — Mark Beauchaine
(74) *Attorney, Agent, or Firm* — Nutter McClennen & Fish LLP; John J. Penny, Jr.; Christina M. Sperry

(57) ABSTRACT

Transportation state evaluation methods, transportation state evaluation programs, and recording media processing devices are provided. In one embodiment, a check processing device has an insertion direction evaluation means that determines if an orientation of a check is correct or not based on a detection signal from a magnetic head, a multifeed detector and multifeed evaluation means that detect multifeeding, an enable/disable control means that enables or disables the insertion direction evaluation and multifeed detection operations of the insertion direction evaluation means and multifeed evaluation means, and a control means that unconditionally enables multifeed detection when only the insertion direction evaluation is enabled. Multifeed detection is always enabled when insertion direction evaluation is enabled because the insertion direction evaluation means can return a detection error when multifeeding occurs. By disabling the insertion direction evaluation when multifeeding occurs, situations in which the insertion direction is determined incorrectly are eliminated.

17 Claims, 7 Drawing Sheets

| | MULTIFEEDING | INSERTION DIRECTION |
|---|---|---|
| PATTERN 1 | DISABLE | DISABLE |
| PATTERN 2 | ENABLE | DISABLE |
| PATTERN 3 | DISABLE | ENABLE |
| PATTERN 4 | ENABLE | ENABLE | ← CHANGE TO

TRANSPORTATION STATE EVALUATION METHOD FOR A RECORDING MEDIA PROCESSING DEVICE

BACKGROUND OF THE INVENTION

1. Field of Invention

The present invention relates to a recording media processing device that reads magnetic ink characters while conveying recording media such as checks that are printed with magnetic ink characters one at a time through a media transportation path. The invention relates more particularly to a recording media processing device that has a function for evaluating the transportation state of the conveyed recording media, including media orientation and multifeeding.

2. Description of Related Art

Check processing devices for processing checks and similar instruments are one example of a recording media processing device that processes recording media printed with magnetic ink characters. In stores as well as banks and other financial institutions, checks, promissory notes, and other check-like instruments received from customers are processed by a check processing device to read the printed magnetic ink characters, image the front and back of the check, and handle transaction processing.

The check processing device reads the magnetic ink characters and images the front and back of the checks by means of a magnetic head and a image sensors as the checks are conveyed one by one through the transportation path. Two storage pockets are formed at the downstream end of the transportation path, checks from which the magnetic ink characters were read normally are discharged into a first storage pocket, and checks from which the magnetic ink characters could not be read correctly are discharged into a second storage pocket. See, for example, Japanese Unexamined Patent Appl. Pub. JP-A-2004-206362.

Multifeeding, in which a plurality of checks are conveyed together overlapping each other, also occurs in check processing devices. When multifeeding occurs, the magnetic ink characters can be read from the top check in the stack that is conveyed with the read side against the magnetic head (also referred to herein as the "read-side check"), but the magnetic ink characters cannot be read from the checks on the other side of the top check (also referred to herein as the "multifeed-side check"). This results in a transaction error because the read magnetic ink character information does not match the check processed by the check processing device.

To solve this problem, Japanese Unexamined Patent Appl. Pub. JP-A-2005-225661 teaches a check processing device that has a multifeed detection means to detect multifeeding, and interrupts check transportation when multifeeding is detected. This multifeeding detection means detects the thickness of the check conveyed through the transportation path, and determines that multifeeding occurred if the detected thickness is greater than or equal to a predetermined thickness.

Some checks may also be inserted upside down with the top and bottom reversed and/or backwards with the front and back reversed from the expected normal orientation. In both of these situations the magnetic ink characters on the conveyed check will not pass the reading position of the magnetic head, and the magnetic ink characters cannot be read.

In order to quickly process checks that are not inserted in the correct orientation, we proposed in Japanese Unexamined Patent Appl. Pub. JP 2008-117040a check processing device that has an insertion direction evaluation means for determining the check orientation, and discharging checks that are loaded incorrectly into the second storage pocket without applying the character recognition process. If the change in the detection signal from the magnetic head is less than a predetermined level, the insertion direction evaluation means determines that the recording medium is inserted with the top and bottom inverted or with the front and back reversed. If the change in the detection signal is greater than or equal to the predetermined level, it compares the detection signal with the prestored signal patterns for magnetic ink character recognition to determine if the front and back of the recording medium are reversed.

When multifeeding occurs, however, the insertion direction evaluation means can make the wrong decision. For example, the orientation of the check on the read side of the multifed checks may be determined to be wrong even if the insertion directions of the checks on the read side and the multifeed side are correct. This decision error occurs when the magnetic head detects the change in the field strength produced by the magnetic ink characters of the checks on both the read side and multifeed side, and the detection signal cannot be verified with the signal patterns for magnetic ink character recognition.

If the check on the read side of the multifed stack is inserted with the top and bottom and front and back reversed but the check on the multifeed side is inserted correctly, the check on the read side may be wrongly determined to be inserted correctly. This is because the change in the field produced by the magnetic ink characters on the check on the multifeed side is also detected by the magnetic head, and this detection signal is compared with the signal patterns for magnetic ink character recognition.

If the insertion direction is incorrectly detected, the checks cannot be processed quickly even though the check processing device has an insertion direction evaluation means. The information printed on the read-side check and the information from the read magnetic ink characters will also not match, and the transaction process based on the read information will therefore also be wrong.

Because the check processing device has a multifeed detection means in addition to an insertion direction evaluation means, incorrect determination of the insertion direction can be eliminated if the check processing device is controlled so that multifeeding and the insertion direction are always detected together. However, check processing devices are generally configured so that whether multifeeding is detected and whether the insertion direction is detected can be controlled separately as needed by the user.

For example, check processing devices are also used to capture images of both the front and back of each check in order to save images of the front and back of each check as proof of check usage. Detecting the insertion direction is not necessary in such applications because the front and back images captured by the image sensors can be used regardless of the check insertion direction. In addition, if the insertion direction is detected based on the detection signal from the magnetic head even though magnetic ink character recognition is not applied, the speed of the check imaging process drops. This happens because the user selects controlling the check processing device to determine only multifeeding.

SUMMARY OF THE INVENTION

A recording media processing device, a transportation state evaluation method, and a program for evaluating the transportation state according to the present invention can eliminate situations in which the insertion direction is incorrectly determined in a recording media processing device that has an insertion direction evaluation means for determining the insertion direction of the recording media conveyed through the transportation path.

A recording media processing device, a transportation state evaluation method, and a program for evaluating the transportation state according to the present invention can eliminate situations in which the insertion direction is incorrectly determined in a check processing device that enables separately setting whether or not to apply multifeed detection and whether or not to detect the insertion direction according to the user's needs.

A first aspect of the invention is a transportation state evaluation method for a recording media processing device, including steps of: reading magnetic ink characters by means of a magnetic head from a recording medium passing the magnetic ink character reading position on a transportation path; performing an insertion direction evaluation to determine based on a detection signal from the magnetic head whether the orientation of the conveyed recording medium is correct; performing a multifeed detection to determine multifeeding of the conveyed recording medium; and disabling the result of the insertion direction evaluation if the multifeed detection confirms multifeeding.

If multifeeding occurs in a check processing device that determines the insertion direction of the conveyed recording medium based on detection signals from a magnetic head, the magnetic head will detect change in the magnetic field produced by the magnetic ink characters printed on the recording medium on the multifeed side (that is, the recording medium behind the recording medium that is in contact with the magnetic head), and the insertion direction may be incorrectly detected. To eliminate incorrectly detecting the insertion direction, the result of the insertion direction evaluation is disabled, that is, rendered void, when multifeeding is detected. Processing the recording medium based on an incorrect determination of the insertion direction can therefore be avoided.

The transportation state evaluation method for a recording media processing device according to another aspect of the invention also has steps of receiving a multifeed detection setting input that sets whether to perform multifeed detection or whether to enable or disable the result of multifeed detection before the recording medium is conveyed; and disabling the insertion direction evaluation or the result of the insertion direction evaluation when multifeed detection is disabled.

This aspect of the invention avoids enabling only the insertion direction evaluation, and therefore eliminates erroneously determining the insertion direction. The insertion direction evaluation can also be enabled or disabled with priority given to the multifeed detection setting.

In another aspect of the invention, the transportation state evaluation method for a recording media processing device also has steps of: receiving an insertion direction evaluation setting input that sets whether to perform the insertion direction evaluation or whether to enable or disable the result of insertion direction evaluation before the recording medium is conveyed; and unconditionally setting the enable/disable setting of the enabling multifeed detection to enabled when the insertion direction evaluation is enabled.

This assures that multifeeding is always detected when the insertion direction evaluation is enabled, and thus eliminates erroneously determining the insertion direction.

Another aspect of the invention is a transportation state evaluation program for a recording media processing device that reads magnetic ink characters by means of a magnetic head from a recording medium passing the magnetic ink character reading position on a transportation path, and determines the transportation state of the conveyed recording medium based on a detection signal from the magnetic head and a detection signal from a multifeed detector for detecting multifeeding of the conveyed recording medium, the program causing the recording media processing device or a computer connected to the recording media processing device to execute steps including: performing an insertion direction evaluation process to determine based on a detection signal from the magnetic head whether the orientation of the conveyed recording medium is correct; performing a multifeed detection process to determine multifeeding of the conveyed recording medium based on a detection signal from the multifeed detector; and disabling the result of the insertion direction evaluation if the multifeed detection confirms multifeeding.

The transportation state evaluation program for a recording media processing device according to this aspect of the invention disables the result of the insertion direction evaluation when multifeeding is detected, and can therefore eliminate erroneously determining the insertion direction. By rendering this process as a program for evaluating the transportation state, the program can be executed by the recording media processing device or a computer connected to the recording media processing device.

Preferably, to avoid the insertion direction evaluation alone being enabled when multifeed detection is disabled, the transportation state evaluation program also causes the recording media processing device or a computer connected to the recording media processing device to execute steps including: receiving a multifeed detection setting input that sets whether to perform multifeed detection or whether to enable or disable the result of multifeed detection before the recording medium is conveyed; and disabling the insertion direction evaluation or the result of the insertion direction evaluation when multifeed detection is disabled.

In addition, to avoid the insertion direction evaluation alone being enabled, the transportation state evaluation program also causes the recording media processing device or a computer connected to the recording media processing device to execute steps including: receiving an insertion direction evaluation setting input that sets whether to perform the insertion direction evaluation or whether to enable or disable the result of insertion direction evaluation before the recording medium is conveyed; and unconditionally setting the enable/disable status of the multifeed detection to enabled when the insertion direction evaluation is enabled.

Another aspect of the invention is a recording media processing device having: a transportation path for conveying recording media; a magnetic head for reading magnetic ink characters from recording media passing a predetermined magnetic ink character reading position on the transportation path; a multifeed detector for detecting multifeeding of the conveyed recording media; and an insertion direction evaluation unit for performing an insertion direction evaluation that determines based on a detection signal from the magnetic head whether the orientation of the conveyed recording medium is correct; a multifeeding evaluation unit for performing a multifeed evaluation determining based on a detection signal from the multifeed detector whether the conveyed recording media are in a multifeed condition; and a control unit that disables the result of the insertion direction evaluation when a multifeed state is confirmed by the multifeeding evaluation unit.

When multifeeding is detected by the recording media processing device according to this aspect of the invention, the control unit disables, that is, voids, the result from the insertion direction evaluation, and can thereby eliminate incorrectly determining the insertion direction.

Further preferably, the recording media processing device also has a multifeed evaluation setting unit that sets whether to perform the multifeed evaluation or whether to enable or disable the result of the multifeed evaluation. The control unit does not perform the insertion direction evaluation or disables the result of the insertion direction evaluation when multifeed evaluation is disabled.

In another aspect of the invention, the recording media processing device also has an insertion direction evaluation setting unit that sets whether to perform the insertion direction evaluation or whether to enable or disable the result of the insertion evaluation. The control unit unconditionally enables the multifeed evaluation when the insertion direction evaluation is enabled.

Another aspect of the invention is a recording media processing device having: a transportation path for conveying recording media; a magnetic head for reading magnetic ink characters from recording media passing a predetermined magnetic ink character reading position on the transportation path; a multifeed detector unit for detecting multifeeding of the conveyed recording media; and an insertion direction evaluation unit for performing an insertion direction evaluation that determines based on a detection signal from the magnetic head whether the orientation of the conveyed recording medium is correct; a multifeeding evaluation unit for perfoming a multifeed evaluation determining based on a detection signal from the multifeed detector whether the conveyed recording medium is in a multifeed condition; and a multifeed evaluation setting unit that sets whether to perform multifeed evaluation or whether to enable or disable the result of the multifeed evaluation.

Preferably, the recording media processing device also has an enable/disable setting means for insertion direction evaluation that sets whether to perform insertion direction evaluation or whether to enable or disable the result of the insertion direction evaluation.

Further preferably, the recording media processing device also has a control unit that does not perform the insertion direction evaluation or disables the result of the insertion direction evaluation when the multifeeding evaluation is disabled.

Further preferably, the recording media processing device also has an insertion direction evaluation setting unit that sets whether to perform insertion direction evaluation or whether to enable or disable the result of the insertion direction evaluation.

Further preferably, the control unit unconditionally enables the multifeed evaluation when the insertion direction evaluation is enabled.

Another aspect of the invention is a recording media processing device that has: a transportation path for conveying recording media; a reading unit that reads characters from the recording media passing through the transportation path; a multifeed detector that detects multifeeding of the conveyed recording media; an insertion direction evaluation unit for performing an insertion direction evaluation that determines based on a detection signal from the reading unit whether the orientation of the conveyed recording medium is correct; a multifeeding evaluation unit for performing a multifeed evaluation that determines based on a detection signal from the multifeed detector whether the conveyed recording medium is in a multifeed condition; and a control unit that continues processing after the multifeeding evaluation regardless of the result from the insertion direction evaluation unit when multifeeding is confirmed by the multifeeding evaluation.

If multifeeding occurs in a check processing device that determines the insertion direction of the conveyed recording medium based on detection signals from a magnetic head, the magnetic head will detect change in the magnetic field produced by the magnetic ink characters printed on the recording medium on the multifeed side (that is, the recording medium behind the recording medium that is in contact with the magnetic head), and the insertion direction may be incorrectly detected. To eliminate incorrectly detecting the insertion direction, the result of the insertion direction evaluation is disabled, that is, rendered void, when multifeeding is detected. Processing the recording medium based on an incorrect determination of the insertion direction can therefore be avoided.

If multifeed detection can be enabled or disabled and the insertion direction evaluation can be enabled or disabled before the recording medium is conveyed, a configuration pattern in which only the insertion direction evaluation is enabled can be voided. This assures that multifeed detection is always applied when the insertion direction is evaluated, and thus eliminates situations in which the insertion direction is detected incorrectly.

Other objects and attainments together with a fuller understanding of the invention will become apparent and appreciated by referring to the following description and claims taken in conjunction with the accompanying drawings.

DESCRIPTION OF PREFERRED EMBODIMENTS

A preferred embodiment of a check processing device according to the present invention is described below with reference to the accompanying figures.

General Configuration

Figure 1A:
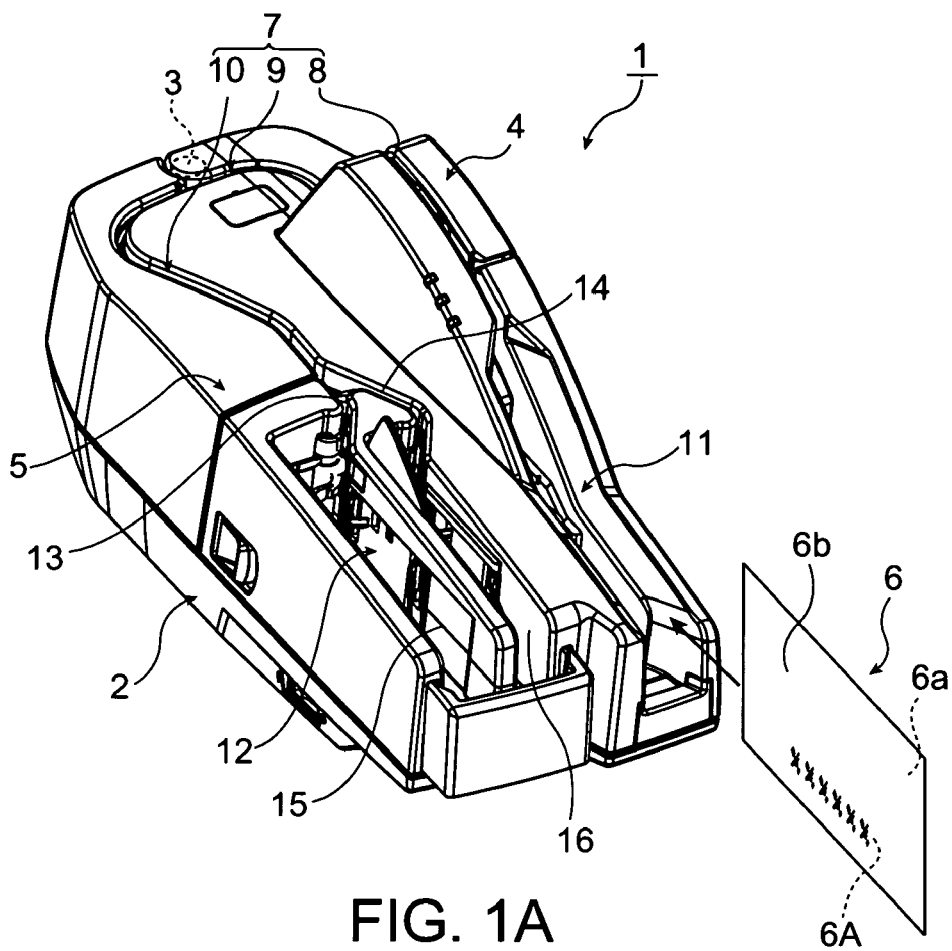
FIG. 1 is an oblique view and a plan view of a check processing device according to the present invention.
Figure 1B:
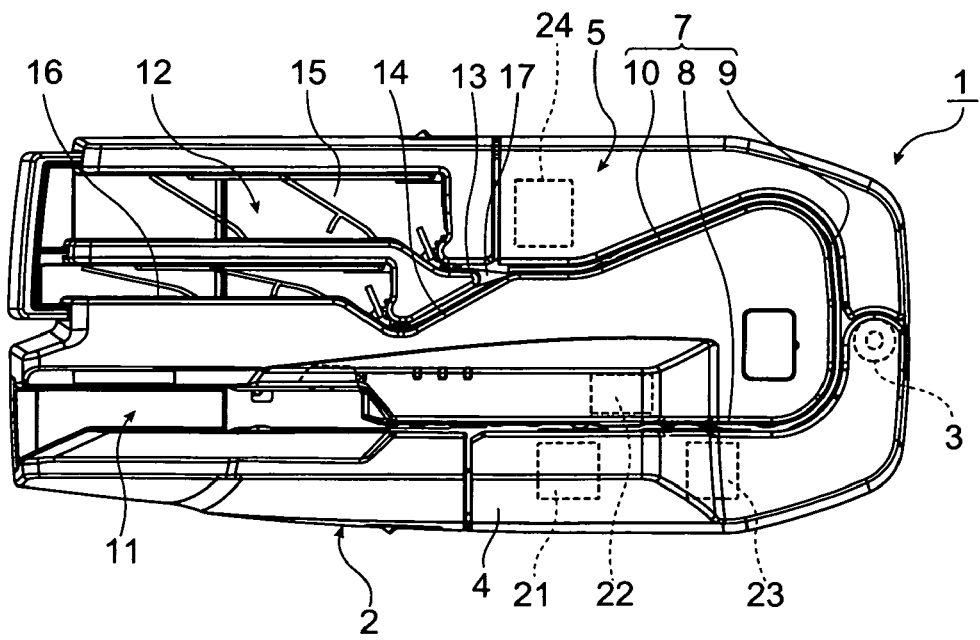

FIG. 1A is an external oblique view and FIG. 1B is a plan view of a check processing device 1 according to a preferred embodiment of the invention.

The check processing device 1 has a case 2 on the main unit and a pair of left and right access covers 4 and 5 that open and close pivoting on a vertical support pin 3 disposed at the back end of the case 2. A check transportation path 7 for conveying checks 6 is formed between the case 2 and the access covers 4 and 5.

The check transportation path 7 is a narrow vertical slot that curves in a basically U-shaped configuration when seen from above. The check transportation path 7 includes in order from the upstream end in the check transportation direction an upstream transportation path portion 8, a curved transportation path portion 9, and a downstream transportation path portion 10.

The upstream end of the upstream transportation path portion 8 is connected to a check supply unit 11, which is a wide vertical channel. The downstream end of the downstream transportation path portion 10 is connected to a check storage unit 12.

The check storage unit 12 has first and second branch paths 13 and 14, which are narrow vertical channels, connected to the downstream end of the downstream transportation path portion 10, and first and second storage pockets 15 and 16 connected to the downstream ends of the first and second branch paths 13 and 14.

A flapper 17 that directs checks 6 discharged from the downstream transportation path portion 10 to the first storage pocket 15 or second storage pocket 16 is located at the junction between the first and second branch paths 13 and 14.

As shown in FIG. 1, each check 6 has an MICR line 6A printed along the long bottom edge on the front 6a of the check 6. Also recorded on the front 6a against a patterned background are the check amount, payer and payee, various numbers, and the payer signature. An endorsement is recorded on the back 6b of the check 6. The checks 6 are loaded in the check supply unit 11 with the tops and bottoms of the checks together and the fronts 6a facing the outside of the substantially U-shaped check transportation path 7.

As indicated by the dotted lines in FIG. 1B, a front contact image scanner 21 for imaging the fronts 6a of the checks 6, a back contact image scanner 22 for imaging the backs 6b of the checks 6, a magnetic head 23 for reading the MICR line 6A, and a printing mechanism 24 for printing ELECTRONIC FUNDS TRANSFER, for example, on the check front 6a are disposed in this order along the check transportation path 7. The magnetic ink character reading position of the magnetic head 23 is positioned to include the location where the MICR line 6A of the check 6 passes when the check 6 is conveyed in the correct orientation through the transportation path.

After a check 6 is delivered from the check supply unit 11, the front and back sides of the check 6 are imaged and the magnetic ink character line 6A printed on the check front 6a is read as the check 6 travels through the check transportation path 7. If the information is read correctly, ELECTRONIC FUNDS TRANSFER or other information is printed on the check 6, and the check 6 is directed by the flapper 17 to the first storage pocket 15 and stored in the first storage pocket 15. Checks 6 that cannot be scanned or read correctly are not printed and are diverted to and stored in the second storage pocket 16.

Internal Construction

Figure 2:
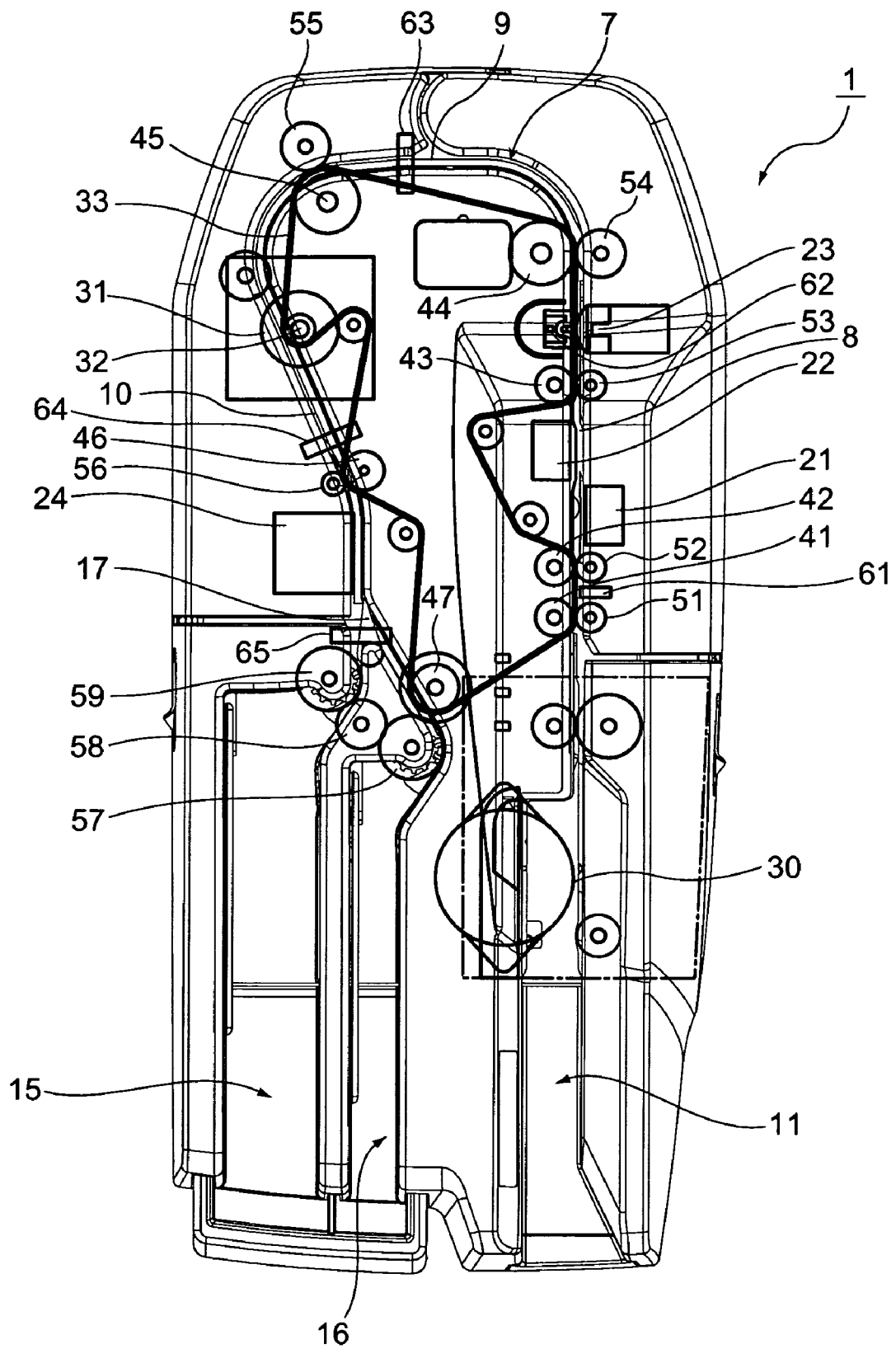
FIG. 2 describes the internal configuration of the check processing device.

FIG. 2 describes the internal configuration of the check processing device 1.

The check supply unit 11 has a check separating and feeding mechanism with a check feeding motor 30 for feeding the checks 6 that are loaded in a bunch into the check supply unit 11 one at a time into the check transportation path 7.

The transportation mechanism for conveying the checks 6 along the check transportation path 7 includes a transportation motor 31, a drive pulley 32 mounted on the rotating shaft of the transportation motor 31, a set of transportation rollers 41 to 47 disposed along the check transportation path 7, and a set of pressure rollers 51 to 57 that are pressed against and rotate in conjunction with the transportation rollers 41 to 47.

Rotation of pressure roller 57 is transferred through a transfer gear 58 to a discharge roller 59.

An endless belt 33 that transfers rotation of the transportation motor 31 shaft to the transportation rollers 41 to 47 also transfers power to the transportation rollers 41 to 47.

Transportation rollers 41 to 44 are disposed at the upstream end and middle of the upstream-side transportation path portion 8, and near where the upstream-side transportation path portion 9 connects to the curved transportation path portion 9.

Transportation roller 46 is in the middle of the downstream-side transportation path portion 10, and transportation roller 47 is located at the discharge opening into the second storage pocket 16. Discharge roller 59 is disposed at the discharge opening into the first storage pocket 15.

A front contact image sensor 21 is disposed as the front image scanner, and a back contact image sensor 22 is disposed as a back image scanner, between the transportation rollers 42 and 43. A magnetic head 23 for magnetic ink character reading is disposed between transportation rollers 43 and 44.

A printing mechanism 24 is disposed on the downstream side of the transportation roller 46 in the downstream-side transportation path portion 10. The printing mechanism 24 can move between a printing position applying pressure to the check 6 and a standby position retracted from this printing position by means of a drive motor (not shown in the figure).

Various sensors for check 6 transportation control are also disposed to the check transportation path 7.

A paper length detector 61 for detecting the length of the conveyed check 6 is located between transportation rollers 41 and 42.

A multifeed detector 62 for detecting if two or more checks 6 are being fed together (also referred to as a multifeed condition) is located opposite the magnetic head 23.

A jam detector 63 is located at a position on the upstream side of the transportation roller 45. A check is known to be jammed in the check transportation path 7 if the jam detector 63 detects a check 6 continuously for a prescribed time or longer.

A print detector 64 for detecting the presence of a check 6 to be printed by the print mechanism 24 is located on the upstream side before the transportation roller 46.

A discharge detector 65 for detecting checks 6 discharged into the first and second storage pockets 15 and 16 is disposed where the first and second branch paths 13 and 14 branch from the downstream transportation path portion 10 to the first and second storage pockets 15 and 16.

A flapper 17 that is driven by a drive motor not shown to switch the discharge path is disposed where the first and second branch paths 13 and 14 diverge. The flapper 17 selectively switches the connection of the downstream end of the downstream transportation path portion 10 to the first and second storage pockets 15 and 16, and guides the check 6 to the selected storage pocket.

Multifeed Detector

Figure 3:
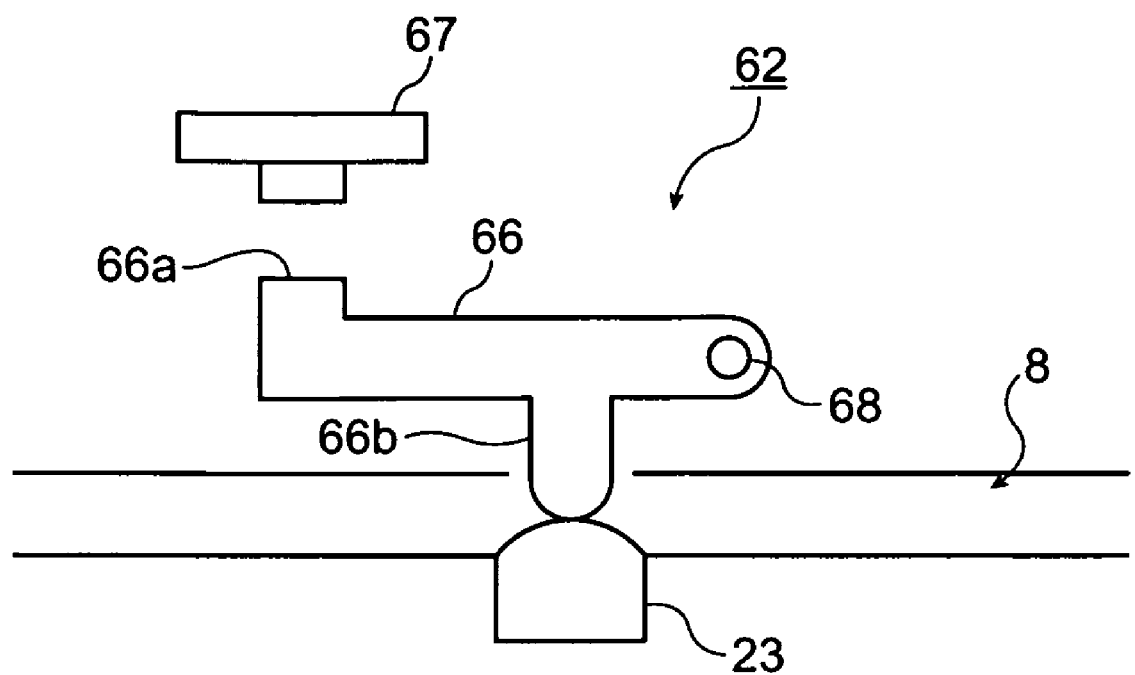
FIG. 3 is a schematic plan view describing the configuration of the multifeed detector.

The multifeed detector 62 detects the thickness of the check 6 passing the magnetic ink character reading position of the magnetic head 23 as described in FIG. 3, a schematic plan view of the multifeed detector 62.

As shown in FIG. 3, a pressure lever 66 for pressing the conveyed check 6 to the magnetic head 23 is disposed opposite the magnetic head 23 with the upstream transportation path portion 8 therebetween. The multifeed detector 62 includes this pressure lever 66 and a displacement sensor 67 that detects the displacement of the pressure lever 66 when the pressure lever 66 presses the check 6 conveyed through the upstream transportation path portion 8 to the magnetic head 23.

The pressure lever 66 is a bar-like member that is supported pivotably on a pivot pin 68 passing through one end part of the pressure lever 66. The end part curves toward the displacement sensor 67 with the face at the distal end being the detection portion 66a opposing the displacement sensor 67. A pressure member 66b protrudes toward the magnetic head 23 from approximately the middle of the pressure lever 66. A spring member not shown urges the pressure lever 66 toward the magnetic head 23, and the pressure member 66b touches the magnetic head 23 when a check 6 is not interceding in the upstream transportation path portion 8.

When a check 6 passes between the magnetic head 23 and the pressure member 66b, the pressure lever 66 pivots away from the magnetic head 23 according to the thickness of the check 6. The displacement sensor 67 detects the displacement of the detection portion 66a of the pivoted pressure lever 66. If this displacement exceeds a predetermined amount set according to the normal check 6 thickness, check multifeeding is determined to have occurred.

The front and back contact image scanners 21 and 22 can alternatively be used to render the multifeed detector. In this case the images captured by the scanners are analyzed and multifeeding is determined to have occurred if image data from two checks is found in the captured images.

Control System

Figure 4:
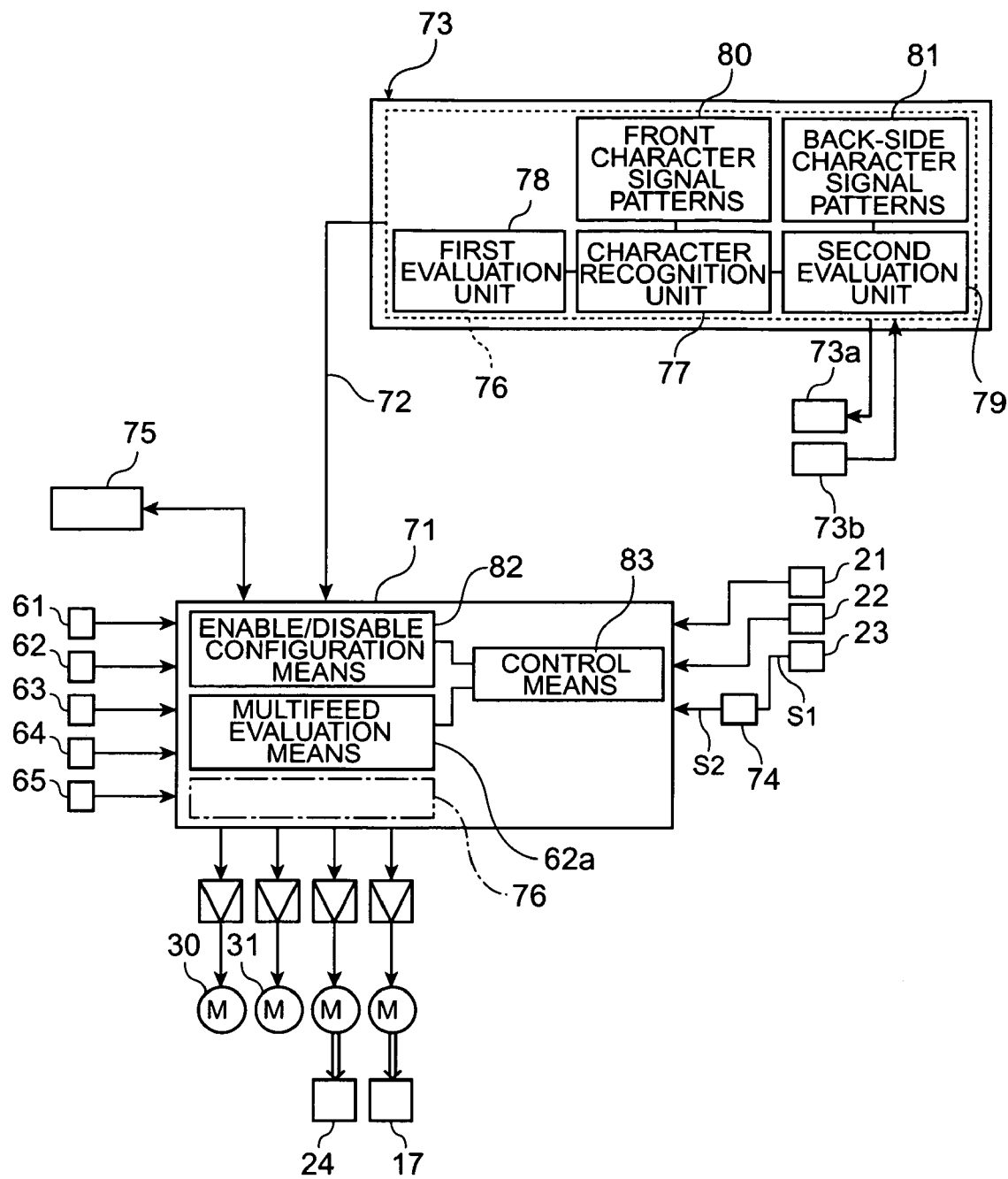
FIG. 4 is a schematic block diagram showing the control system of the check processing device.

FIG. 4 is a schematic block diagram showing the control system of the check processing device 1. The control system of the check processing device 1 has a control unit 71 that includes a CPU and memory such as ROM or RAM. The ROM stores a program for the CPU to process it. The control unit 71 is connected to a host computer system 73 by a communication cable 72.

The computer system 73 has a display 73a and input/output devices such as a keyboard, mouse, or other operating unit 73b, and commands such as a start command for the check reading operation and control commands for enabling and disabling sensor operations are input from the computer system 73 to the control unit 71.

When a command to start reading is received, the control unit 71 drives the check feeding motor 30 to feed the checks 6 one at a time from the check supply unit 11 into the check transportation path 7 and convey the checks 6 through the check transportation path 7.

The front image data, back image data, and the magnetic ink character information from the check 6 that are captured by the front contact image scanner 21, the back contact image scanner 22, and the magnetic head 23 are input to the control unit 71.

The magnetic head 23 outputs the electromotive force produced by the change in the magnetic field formed by the magnetic ink character line 6A passing the magnetic ink character reading position as the detection signal. The detection signal is converted to a digital signal after amplification and wave shaping by a signal processing circuit 74, and input to the control unit 71.

This input information is then supplied from the control unit 71 to the computer system 73 for image processing and character recognition and deciding if the check was read correctly, and the result of this evaluation is then returned to the control unit 71.

The control unit 71 controls driving the printing mechanism 24 and the flapper 17 based on the result of this evaluation and discharges the read check 6 to either the first or second storage pocket 15 or 16.

The detection signals from the paper length detector 61, the multifeed detector 62, the paper jam detector 63, the print detector 64, and the discharge detector 65 are input to the control unit 71, and the control unit 71 controls check 6 transportation based on these detection signals. An operating unit 75 including a power switch and other operating buttons disposed to the main case 2 is also connected to the control unit 71.

The computer system 73 also has an insertion direction evaluation means 76 that determines if the top/bottom and/or front/back orientations of the check 6 is reversed based on the detection signals from the magnetic head 23. The insertion direction evaluation means 76 includes a character recognition unit 77 and first and second evaluation units 78 and 79.

When the change in the detection signal waveforms is greater than or equal to a predetermined level, the character recognition unit 77 recognizes the magnetic ink characters using a pattern recognition process that compares the detection signals with digital data patterns (front character signal patterns) 80 corresponding to the detection signal waveforms of the magnetic ink characters. If the detection signals match the front character signal patterns 80, the orientation of the check 6 is determined to be correct with the check 6 conveyed in the normal position.

The first evaluation unit 78 determines if check 6 was fed with the top and bottom inverted, or if a non-check slip that is not printed with magnetic ink characters was conveyed. If the change in the waveform of the detection signals from the magnetic head 23 is less than a predetermined level, it is determined that either the orientation of the check 6 is wrong or a slip other than a check is being conveyed.

If the change in the waveform of the detection signals from the magnetic head 23 is greater than or equal to a predetermined level, the second evaluation unit 79 compares the detection signals with digital data patterns (back-side character signal patterns) 81 that correspond to the detection signal waveforms that are output when the magnetic head 23 reads the magnetic ink characters from the back side 6b of the check, and determines if the check 6 was conveyed with the front and back reversed.

Note that the insertion direction evaluation means 76 indicated by the dotted line in FIG. 4 can be disposed on the control unit 71 side in the check processing device 1.

The control unit 71 also has a multifeed evaluation means 62a, an enable/disable configuration means 82, and a control means 83. The multifeed evaluation means 62a detects check multifeeding based on the detection signal from the multifeed detector 62. Based on a control command from the computer system 73, the enable/disable configuration means 82 enables or disables evaluating the insertion direction by the insertion direction evaluation means 76, and enables or disables determining multifeeding by the multifeed evaluation means 62a. If only detecting the insertion direction is enabled, the control means 83 unconditionally enables multifeed detection.

Insertion Direction Evaluation Process

The insertion direction evaluation process whereby the insertion direction evaluation means 76 detects the orientation of the check 6 is described next.

Figure 5A:
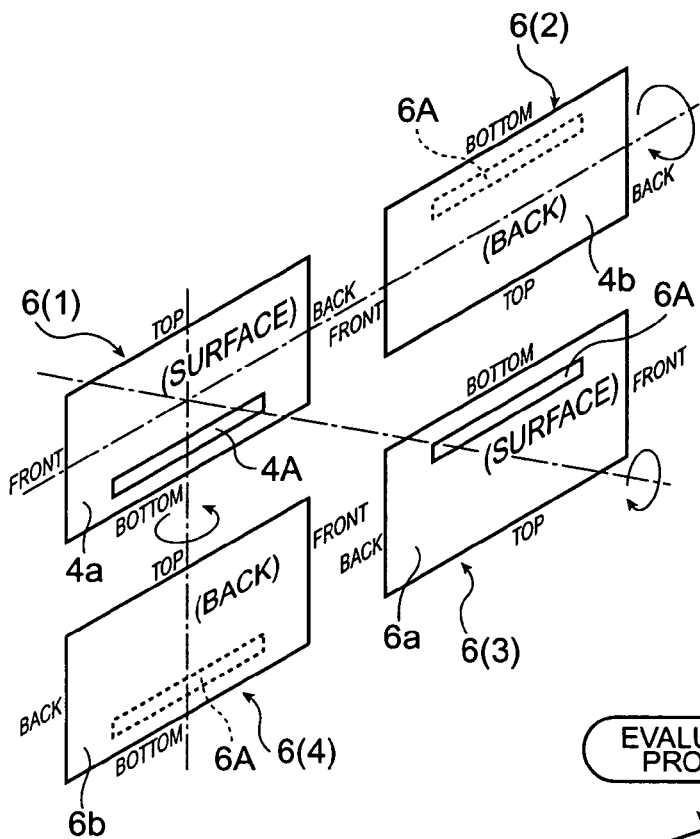
FIG. 5 is a schematic description and flow chart showing the operation of the insertion direction evaluation means.
Figure 5B:
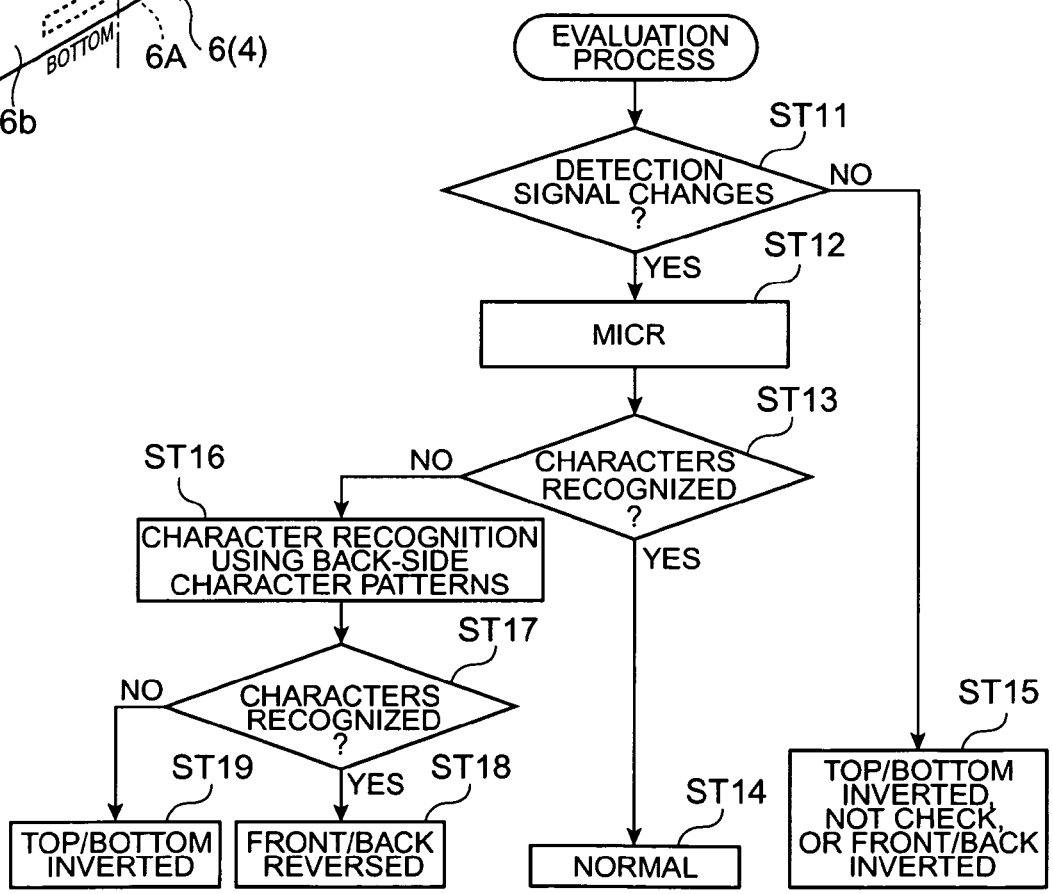

FIG. 5A and FIG. 5B are diagrams and a flow chart describing the insertion direction evaluation process for determining if the orientation of the conveyed check 6 is correct or not based on a detection signal S1 from the magnetic head 23.

FIG. 5A shows the various orientations in which a check 6 can be inserted. Check 6(1) is a check 6 inserted in the normal orientation, and check 6(2) is a check 6 inserted with both the top and bottom and the front and back reversed. Check 6(3) is a check 6 inserted with the top and bottom and the leading and trailing ends reversed, and check 6(4) is a check 6 inserted with the front and back and the leading and trailing ends reversed.

With checks 6(2) and 6(3) the position of the magnetic ink character line 6A is inverted top and bottom from the position on the normally inserted check 6(1), and the magnetic ink character line 6A therefore cannot be read by the magnetic head 23. With check 6(4) the magnetic ink character line 6A will be read from the back side by the magnetic head 23.

These different check 6 orientations can be determined from the detection signals output by the magnetic head 23 in this embodiment of the invention.

This process is described below with reference to the flow chart in FIG. 5B. The first step is to determine if there is actually any change in the detection signal from the magnetic head 23 (step ST11). More specifically, whether the amplitude of the detection signal waveform varies a prescribed amount or more is determined.

Because the magnetic head 23 cannot read the magnetic ink character line 6A and there is no actual change in the detection signal with checks 6(2) and 6(3), the conveyed check is determined to be a check 6(2) and 6(3) with the top and bottom inverted (step ST15). Alternatively in this case, the medium can be determined to be a sheet of paper other than a check on which a magnetic ink character line 6A is not printed. If the check 6(4) is inserted with the front and back reversed and the check is made of thick paper, the amplitude of the waveform of the detection signal from the magnetic head 23 may not vary the prescribed amount or more. This situation can also be detected (step ST15).

If the detection signal varies, the detection signals are compared with the preinstalled front character signal patterns 80 for character recognition (step ST12). If character recognition is possible, it is determined that the check 6 is being conveyed in the normal position (step ST14). More specifically, the check is oriented as indicated by check 6(1).

If character recognition is not possible, the detection signals are compared with the previously stored back-side character signal patterns 81 for character recognition (step ST16). If character recognition is possible in this case, it is determined that the check is conveyed with the front and back reversed as indicated by check 6(4) (step ST18).

If character recognition is not possible, it is determined that the check is conveyed with the top and bottom inverted as in transportation states 6(2) and 6(3) (step ST19). Determining that the top and bottom are reversed is based on whether there is any change in the detection signals in step ST11. However, there are also checks that have a background pattern printed with magnetic ink over the entire front 6a of the check. Because the detection signals from the magnetic head 23 will vary with this type of check 6 even if the top and bottom are inverted, inversion of the top and bottom cannot be determined based on whether or not there is change in the detection signals. However, this embodiment of the invention can determine inversion of the top and bottom even with such checks by referencing the character signal patterns from the back 6b of the check.

Enabling/Disabling Insertion Direction Evaluation and Multifeed Detection

Figures 6A, 6B:
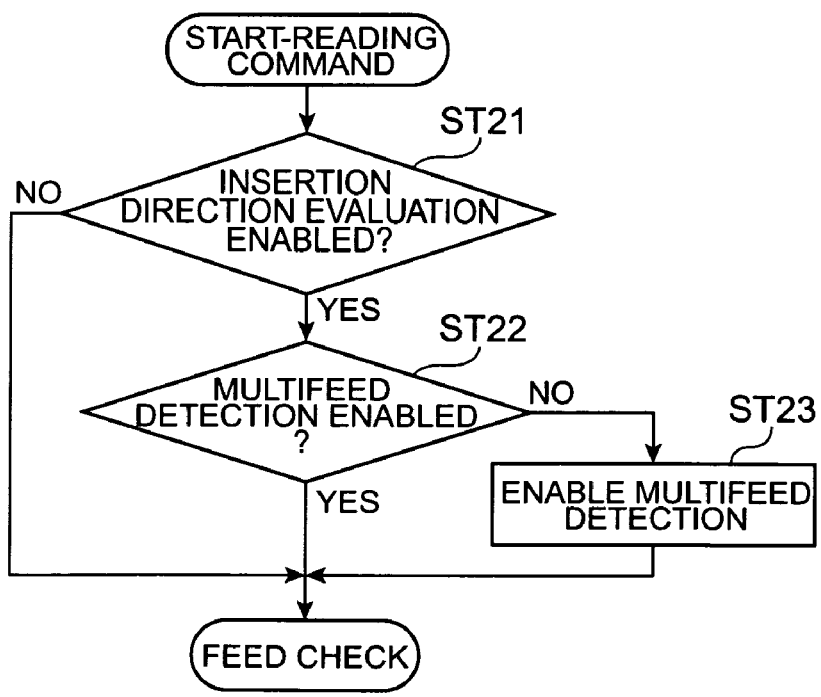
FIG. 6 describes the operation configuring the multifeed detection and insertion direction evaluation operations.

The operation of enabling and disabling the insertion direction evaluation and multifeed detection in the check processing device 1 is described next. FIG. 6A is a table showing the possible combinations in which insertion direction evaluation and multifeed detection can be enabled and disabled, and FIG. 6B is a flow chart describing the operation of enabling and disabling insertion direction evaluation and multifeed detection.

The enable/disable configuration means 82 of the check processing device 1 enables or disables the insertion direction evaluation and enables or disables multifeed detection according to a control signal from the computer system 73. More specifically, there are four possible control patterns as shown in FIG. 6A: a first pattern in which both insertion direction evaluation and multifeed detection are disabled, a second pattern in which only multifeed detection is enabled, a third pattern in which only insertion direction evaluation is enabled, and a fourth pattern in which both insertion direction evaluation and multifeed detection are enabled.

However, if the third pattern is set when a start-reading command is input, the fourth pattern enabling both insertion direction evaluation and multifeed detection is unconditionally set. This prevents only the insertion direction evaluation being enabled.

Described more specifically referring to the flow chart in FIG. 6B, when the operator asserts the start-reading command from the operating unit 73b of the host computer system 73, the control means 83 determines if the insertion direction evaluation is enabled (step ST21). If the insertion direction evaluation is enabled, the control means 83 determines if multifeed detection is enabled (step ST22). If multifeed detection is disabled, the control means 83 unconditionally sets the enable/disable setting for multifeed detection to enable (step ST23). The check feeding motor 30 is then driven to feed a check 6 from the check supply unit 11 to the check transportation path 7.

However, if in step ST21 the insertion direction evaluation is disabled, the check feeding motor 30 is driven to feed a check 6 into the check transportation path 7 irrespective of whether multifeed detection is enabled or disabled.

The control means 83 detects the settings of various functions when the check processing device 1 receives a start-reading command and enables multifeed detection as necessary, but alternatively could detect the settings of the various functions when the check processing device 1 power turns on and enable multifeed detection as necessary. Further alternatively, the settings of the various functions can be detected both when the check processing device 1 receives a start-reading command and when the check processing device 1 power turns on.

In addition, the control means 83 detects the multifeed detection setting after detecting the insertion direction evaluation setting, but because the control means 83 unconditionally enables multifeed detection by the multifeed detector 62 when it detects that only the insertion direction evaluation is enabled, the order in which the insertion direction evaluation and multifeed detection settings are detected can be reversed.

Transportation State Evaluation Process

Figure 7:
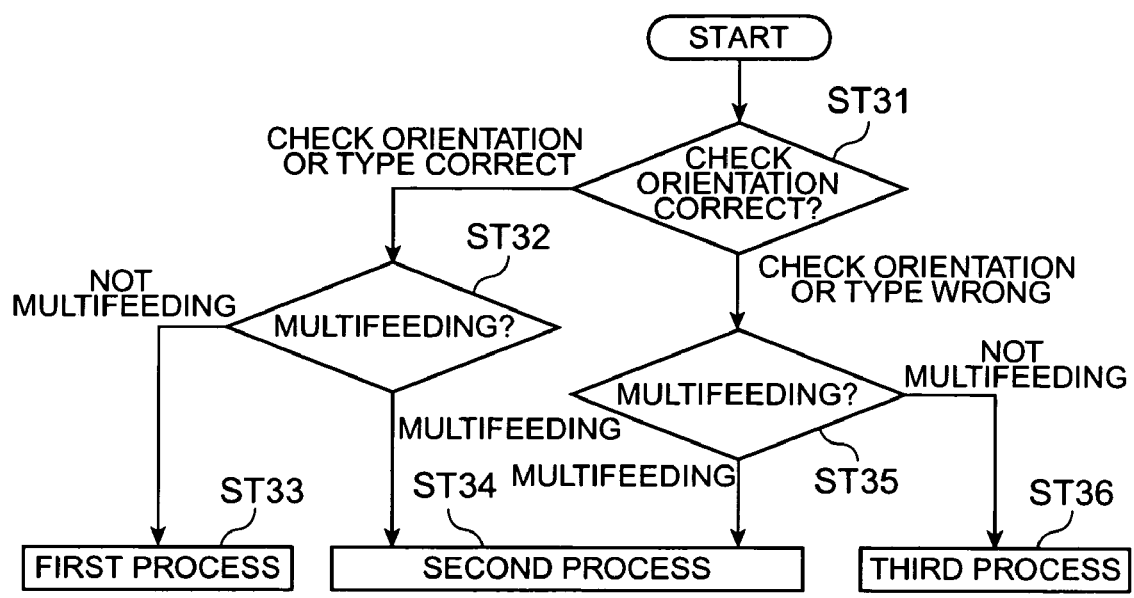
FIG. 7 is a flow chart describing the insertion state evaluation process.

FIG. 7 is a flow chart describing the transportation state evaluation process of the check processing device according to this embodiment of the invention, and more particularly shows the operation determining the transportation state when both the insertion direction evaluation and multifeed detection are enabled.

When a check 6 fed into the check transportation path 7 is conveyed along the check transportation path 7, the front and back of the conveyed check 6 are imaged and the MICR line 6A is read by the front contact image scanner 21, the back contact image scanner 22, and the magnetic head 23, respectively. The read information is then sent over the communication cable 72 to the host computer system 73. Because the insertion direction evaluation is enabled in this case, the computer system 73 determines if the insertion direction of the conveyed check 6 is correct or not (step ST31).

If the orientation of the check 6 is correct, the computer system 73 determines if multifeeding occurred (step ST32). If multifeeding is not detected, the read information is determined to be correct and a first process is executed (step ST33).

However, if check multifeeding is detected in step ST32, a second process that is different from the first process executes (step ST34). This is because even if the insertion direction evaluation determines that the insertion direction of the check 6 is correct, this determination may be wrong if multifeeding is also detected.

If the check on the read side is inverted top/bottom as well as front/back but the check on the multifeed side is correctly oriented, the insertion direction of the check on the read side could be wrongly determined to be correct. This wrong determination results because the magnetic head 23 detects the change in the field produced by the magnetic ink characters on the check on the multifeed side, and the character recognition unit 77 compares the resulting detection signal with the front character signal patterns 80. When such a wrong determination occurs, the information from the check on the read side will not match the captured magnetic ink character data, and a process that is different from the first process is therefore used.

If step ST31 determines that the insertion direction of the check 6 is incorrect, the computer system 73 determines if multifeeding occurred (step ST35). If multifeeding is not detected, a third process is executed to determine if the check 6 from which the information was read is conveyed in the correct orientation or if a recording medium of unknown type is conveyed (step ST36).

If step ST35 confirms multifeeding, the likelihood is high that the magnetic ink characters cannot be recognized correctly from the read information. In addition, the insertion direction evaluation could determine that the insertion direction of the check 6 is wrong, but this determination could also be wrong. In this case the second process is executed (step ST34).

A wrong determination in this case can occur when, for example, the insertion directions of the read-side check and multifeed-side check are correct but the orientation of the check on the read side is determined to be wrong. This can happen because the magnetic head 23 detects the change in the field produced by the magnetic ink characters from the checks on both the read side and multifeed side, but the character recognition unit 77 cannot match the detection signals to the front character signal patterns 80.

The first process is the process executed when the MICR line 6A was read normally. The check 6 can therefore be conveyed, an endorsement can be printed by the printing mechanism 24, and the check 6 can be discharged into the first storage pocket 15.

The second process aborts all processing that occurs downstream from the magnetic head 23, and discharges the check 6 into the second storage pocket 16. If the magnetic ink character data and front and back check images were captured, this process also aborts transaction processing using this information.

The content of the third process can be the same as the second process, or the process can take more specific action based on the result from the insertion direction evaluation means 76.

For example, if the insertion direction of the check 6 is determined to be inverted front/back, the back-side character signal patterns 81 can be used for character recognition using the magnetic ink character data read by the second evaluation unit 79. The image data for the front and back images can also be switched. These operations enable processing the same way as when the MICR line 6A is read normally, and the first process described above is executed after these processes are executed by the computer system 73.

Furthermore, if it is determined that the check 6 was conveyed with the top and bottom inverted, the image data for the front and back images can be simply inverted top and bottom, and it is not necessary to scan the front and back of the check again. A process identical to the first process can therefore be applied if an image process that reverses the top and bottom is applied and the operator reads and manually enters the magnetic ink character information from the check 6 discharged into the check storage unit 12 into the computer system 73.

When any of the first to third processes is executed, the check feeding motor 30 is driven to feed the next check 6 in the check supply unit 11 into the check transportation path 7.

The check processing device 1 according to this embodiment of the invention always enables multifeed detection when the insertion direction evaluation is enabled. This eliminates situations in which the insertion direction evaluation means 76 incorrectly detects the insertion direction of the check 6, and thus enables processing the check 6 appropriately.

Furthermore, because the insertion direction evaluation means 76 makes the wrong determination only when multifeeding also occurs, the checks are processed the same way when multifeeding is confirmed regardless of the insertion direction evaluation. As a result, wrong determinations by the insertion direction evaluation means 76 are completely eliminated.

In addition, when multifeeding is confirmed the second process discharges the checks 6 to the second storage pocket 16. The multifed checks can then be easily retrieved from the second storage pocket 16, reoriented, and then reloaded into the check processing device 1.

Other Embodiments

The enable/disable configuration means 82 enables or disables multifeed detection in the foregoing embodiment. Alternatively, however, multifeed detection could always be applied while using the result could be enabled or disabled.

Likewise, the enable/disable configuration means 82 enables or disables the insertion direction evaluation in the foregoing embodiment, but the insertion direction could always be detected while using the result could be enabled or disabled.

Yet further, the enable/disable configuration means 82 unconditionally enables multifeed detection by the multifeed detector 62 when the control means 83 detects that only the insertion direction evaluation is enabled, but the insertion direction evaluation could be unconditionally disabled in this case.

More specifically, when the third pattern is set and only the insertion direction evaluation is enabled, the disabled setting of the multifeed detection is prioritized and the first pattern is unconditionally selected to disable both insertion direction evaluation and multifeed detection. If only the insertion direction is detected and the detected insertion direction is incorrect, the information read from the recording medium will not match the read magnetic ink character data, and problems will develop in downstream processing. This problem can be eliminated, however, by not detecting the insertion direction if multifeeding is not detected.

The insertion direction evaluation means 76, multifeed evaluation means 62a, enable/disable configuration means 82, control means 83, and transportation state evaluation process are provided as a program for controlling driving the check processing device 1. This program can be rendered as a program that is run by the check processing device 1 to control driving the check processing device 1. This program can also be rendered as a program that is run by the computer system 73 to control driving the check processing device 1.

The embodiment described above applies the invention to a check reading device, but the processing method of the invention can also be applied for handling recording media that are not checks but are printed with magnetic ink characters.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A transportation state evaluation method for a recording media processing device, comprising steps of:
   reading magnetic ink characters with a magnetic head from a recording medium passing a magnetic ink character reading position on a transportation path;
   performing an insertion direction evaluation to determine based on a detection signal from the magnetic head whether the orientation of the recording medium is correct;
   performing a multifeed detection to determine multifeeding of the recording medium; and
   disabling the result of the insertion direction evaluation if the multifeed detection confirms multifeeding.

2. The transportation state evaluation method for a recording media processing device described in claim 1, further comprising steps of:
   receiving a multifeed detection setting input that sets whether to perform the multifeed detection or whether to enable or disable the result of the multifeed detection before the recording medium is conveyed; and
   disabling the insertion direction evaluation or the result of the insertion direction evaluation when multifeed detection is disabled.

3. The transportation state evaluation method for a recording media processing device described in claim 1, further comprising steps of:
   receiving an insertion direction evaluation setting input that sets whether to perform the insertion direction evaluation or whether to enable or disable the result of the insertion direction evaluation before the recording medium is conveyed; and
   unconditionally enabling the multifeed detection when the insertion direction evaluation is enabled.

4. The transportation state evaluation method for a recording media processing device described in claim 1, further comprising a step of, when the result of the insertion direction evaluation is disabled, aborting a transaction processing using the detection signal from the magnetic head.

5. A transportation state evaluation program stored on a computer readable medium, said program for a recording media processing device that reads magnetic ink characters by means of a magnetic head from a recording medium passing a magnetic ink character reading position on a transportation path, and determines the transportation state of the recording medium based on a detection signal from the magnetic head and a detection signal from a multifeed detector for detecting multifeeding of the recording medium, the program causing the recording media processing device or a computer connected to the recording media processing device to execute steps including:
   performing an insertion direction evaluation process to determine based on a detection signal from the magnetic head whether the orientation of the recording medium is correct;
   performing a multifeed detection process to determine multifeeding of the recording medium based on a detection signal from the multifeed detector; and
   disabling the result of the insertion direction evaluation if the multifeed detection confirms multifeeding.

6. The transportation state evaluation program for a recording media processing device described in claim 5, the transportation state evaluation program causing the recording media processing device or a computer connected to the recording media processing device to execute steps also including:
   receiving a multifeed detection setting input that sets whether to perform multifeed detection or whether to enable or disable the result of the multifeed detection before the recording medium is conveyed; and
   disabling the insertion direction evaluation or the result of the insertion direction evaluation when multifeed detection is disabled.

7. The transportation state evaluation program for a recording media processing device described in claim 5, the transportation state evaluation program causing the recording media processing device or a computer connected to the recording media processing device to execute steps also including:
   receiving an insertion direction evaluation setting input that sets whether to perform the insertion direction evaluation or whether to enable or disable the result of the insertion direction evaluation before the recording medium is conveyed; and
   unconditionally enabling the multifeed detection when the insertion direction evaluation is enabled.

8. The transportation state evaluation program for a recording media processing device described in claim 5, the transportation state evaluation program causing the recording media processing device or a computer connected to the recording media processing device to execute steps also including:
   when the result of the insertion direction evaluation is disabled, aborting a transaction processing using the detection signal from the magnetic head.

9. A recording media processing device comprising:
   a transportation path for conveying recording media;
   a magnetic head for reading magnetic ink characters from a recording media passing a predetermined magnetic ink character reading position on the transportation path;
   a multifeed detector for detecting multifeeding of the recording media; and
   an insertion direction evaluation unit for performing an insertion direction evaluation that determines a result based on a detection signal from the magnetic head whether the orientation of the recording medium is correct;
   a multifeeding evaluation unit for performing a multifeed evaluation determining based on a detection signal from the multifeed detector whether the recording media are in a multifeed condition; and
   a control unit that disables the result of the insertion direction evaluation unit when a multifeed state is confirmed by the multifeeding evaluation unit.

10. The recording media processing device described in claim 9, further comprising:

a multifeed evaluation setting unit that sets whether to perform the multifeed evaluation or whether to enable or disable the result of the multifeed evaluation;

wherein the control unit does not perform the insertion direction evaluation or disables the result of the insertion direction evaluation when the multifeed evaluation is disabled.

11. The recording media processing device described in claim 9, further comprising:

an insertion direction evaluation setting unit that sets whether to perform the insertion direction evaluation or whether to enable or disable the result of the insertion direction evaluation;

wherein the control unit unconditionally enables the multifeed evaluation when the insertion direction evaluation is enabled.

12. The recording media processing device described in claim 9, wherein, when the result of the insertion direction evaluation is disabled, the control unit aborts a transaction processing using the detection signal from the magnetic head.

13. A recording media processing device comprising:

a transportation path for conveying recording media;

a magnetic head for reading magnetic ink characters from the recording media;

a multifeed detector that detects multifeeding of the recording media; and an insertion direction evaluation unit for performing an insertion direction evaluation that determines a result based on a detection signal from the magnetic head whether the orientation of the recording medium is correct;

a multifeeding evaluation unit for performing a multifeed evaluation determining based on a detection signal from the multifeed detector whether the recording medium is in a multifeed condition; and a multifeed evaluation setting unit that sets whether to perform multifeed evaluation or whether to enable or disable the result of the multifeed evaluation.

14. The recording media processing device described in claim 13, further comprising:

a control unit that does not perform the insertion direction evaluation or disables the result of the insertion direction evaluation when the multifeeding evaluation is disabled.

15. The recording media processing device described in claim 13, further comprising:

an insertion direction evaluation setting unit that sets whether to perform the insertion direction evaluation or whether to enable or disable the result of the insertion direction evaluation.

16. The recording media processing device described in claim 14, wherein:

the control unit unconditionally enables the multifeed evaluation when the insertion direction evaluation is enabled.

17. A recording media processing device comprising:

a transportation path for conveying recording media;

a reading unit that reads characters from the recording media;

a multifeed detector that detects multifeeding of the recording media;

an insertion direction evaluation unit for performing an insertion direction evaluation that determines a result based on a detection signal from the reading unit whether the orientation of the recording medium is correct;

a multifeeding evaluator for performing a multifeed evaluation that determines based on a detection signal from the multifeed detector whether the recording medium is in a multifeed condition; and a controller that disables the result of the insertion direction evaluation unit when a multifeed state is confirmed by the multifeeding evaluator, and continues processing after the multifeeding evaluation is performed regardless of the result from the insertion direction evaluation unit when multifeeding is confirmed by the multifeeding evaluator.

* * * * *